United States Patent
Xu

(10) Patent No.: US 11,550,412 B2
(45) Date of Patent: Jan. 10, 2023

(54) TOUCH STRUCTURE AND DISPLAY PANEL

(71) Applicant: Wuhan China Star Optoelectronics Semiconductor Display Technology Co., Ltd., Wuhan (CN)

(72) Inventor: Feng Xu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 359 days.

(21) Appl. No.: 16/633,171

(22) PCT Filed: Nov. 5, 2019

(86) PCT No.: PCT/CN2019/115721
§ 371 (c)(1),
(2) Date: Jan. 23, 2020

(87) PCT Pub. No.: WO2021/035951
PCT Pub. Date: Mar. 4, 2021

(65) Prior Publication Data
US 2021/0365140 A1    Nov. 25, 2021

(30) Foreign Application Priority Data

Aug. 29, 2019  (CN) .......................... 201910805403.6

(51) Int. Cl.
*G06F 3/041* (2006.01)
*G02B 1/08* (2006.01)
*G02B 5/30* (2006.01)

(52) U.S. Cl.
CPC ............. *G06F 3/0412* (2013.01); *G02B 1/08* (2013.01); *G02B 5/30* (2013.01); *C09K 2323/031* (2020.08); *C09K 2323/04* (2020.08)

(58) Field of Classification Search
CPC .......... G06F 3/0412; G02B 1/04; G02B 1/08; G02B 5/30; G02B 5/3058; C09K 2323/031; C09K 2323/04; G02F 1/13338; G02F 1/133528; H01L 27/323
See application file for complete search history.

(56) References Cited

U.S. PATENT DOCUMENTS

| 5,676,885 | A | * | 10/1997 | Starzewski | ............... | G02B 1/04 |
| | | | | | | 252/585 |
| 2015/0070605 | A1 | * | 3/2015 | Liu | ....................... | G06F 3/0446 |
| | | | | | | 349/12 |
| 2015/0212614 | A1 | * | 7/2015 | Chen | ..................... | G06F 3/0445 |
| | | | | | | 427/79 |
| 2016/0147113 | A1 | * | 5/2016 | Chang | ................. | G02F 1/13338 |
| | | | | | | 349/12 |
| 2017/0097714 | A1 | * | 4/2017 | Lee | ........................ | G06F 3/0443 |

FOREIGN PATENT DOCUMENTS

| CN | 108693586 | | 10/2018 | | |
| CN | 109860238 | | 6/2019 | | |
| CN | 110609643 | B * | 2/2021 | ............... | G02B 1/04 |
| DE | 0564925 | A2 * | 10/1993 | ............... | G02B 1/04 |
| JP | 06-041383 | | 2/1994 | | |

\* cited by examiner

*Primary Examiner* — Sophie Hon
(74) *Attorney, Agent, or Firm* — PV IP PC; Wei Te Chung; Ude Lu

(57) ABSTRACT

The present invention provides a touch structure and a display panel. The touch structure includes a polarizing layer and a touch layer disposed on a surface of one side of the polarizing layer, wherein a material of the polarizing layer includes a conductive polymer and an iodine molecule.

6 Claims, 2 Drawing Sheets

TOUCH STRUCTURE AND DISPLAY PANEL

RELATED APPLICATIONS

This application is a National Phase of PCT Patent Application No. PCT/CN2019/115721 having International filing date of Nov. 5, 2019, which claims the benefit of priority of Chinese Patent Application No. 201910805403.6 filed on Aug. 29, 2019. The contents of the above applications are all incorporated by reference as if fully set forth herein in their entirety.

FIELD AND BACKGROUND OF THE INVENTION

The present invention relates to the field of display, and in particular, to a touch structure and a display panel.

Due to demand for smart driving, smart home appliances, portable terminals, etc., flexible displays have attracted much attention in recent exhibitions and are considered to be an important development direction for future displays.

Liquid crystal displays or OLED displays have been widely used and widely accepted by market due to advantages of light weight, thinness, and good display effect. However, market demand for thin screens is constantly increasing. In recent years, continuous demands for thickness reduction of whole machines by mobile phone manufacturers have continuously required reduction in thickness of mobile phone screens (TFT-LCD/OLED). A polarizer is one of the main structures of screens, and a thickness of a body of the polarizer is also expected to be increasingly thinner while maintaining normal function, thereby reducing overall thickness of screens.

In this regard, industries continue to develop and reduce the thickness of the polarizer from an initial single piece of about 200 μm to an overall thickness gradually reduced to 100 μm through TAC and PVA structures. Afterwards, polarizer suppliers began to explore to further reduce the thickness by replacing the TAC with a thinner COP material. What's more, by reducing TAC layer, the overall thickness is reduced to about 80 μm. Considering the problems of support strength reduction and reliability, polarizer POL which reduces the TAC layer is mostly used in lower polarizer with anti-reflection film, so that the overall thickness of the upper and lower polarizers can be reduced to about 160 um.

An objective of the present invention is to solve a technical problem that an electrical conductivity of a touch structure in prior display devices is not good.

SUMMARY OF THE INVENTION

To achieve the above object, the present invention provides a touch structure comprising a polarizing layer and a touch layer disposed on a surface of one side of the polarizing layer; wherein a material of the polarizing layer comprises an electrically conductive polymer and an iodine molecule.

Further, a material of the electrically conductive polymer comprises polyacetylene.

Further, carbon atoms in each polyacetylene are arranged in two parallel straight lines.

Further, at least two of the iodine molecules are arranged in a straight line.

Further, a straight line where the iodine molecules are disposed is parallel to a straight line where the carbon atoms are disposed.

Further, the polarizing layer has a thickness ranging from 0.1 μm to 100 μm.

Further, the touch layer comprises at least two touch circuits.

Further, the touch circuit is linear.

To achieve the above object, the present invention further provides a display panel comprising a touch structure as mentioned above.

Further, the display panel further comprising a substrate, a thin film transistor disposed on a surface of one side of the substrate, and a pixel layer disposed on a surface of one side of the thin film transistor away from the substrate. Wherein the touch structure is disposed on a surface of one side of the pixel layer away from the thin film transistor.

The technical effect of the present invention is that an electrically conductive polymer is doped with an iodine molecule, which improves an electrical conductivity of an electrically conductive polymer and realizes a polarizing function. A touch layer is directly integrated on the electrically conductive polymer to realize an integrated structure of a polarizing layer and the touch layer, which reduces a thickness of a display panel and improves performance of the display panel.

Figure 1:
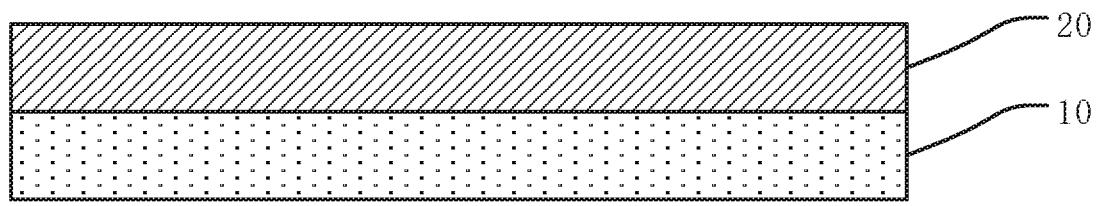
FIG. 1 is a side view of a touch structure according to an embodiment of the present invention.

Reference Numerals of Some Components are Identified as Follows

10: polarizing layer; 20: touch layer; 21: touch circuit; 1: substrate; 2: thin film transistor; 3: pixel layer; 4: touch structure.

DESCRIPTION OF SPECIFIC EMBODIMENTS OF THE INVENTION

Preferred embodiments of the present invention will be described in detail below with reference to the accompanying drawings, which will fully introduce the technical content of the present invention to those skilled in the art, and prove that the invention can be implemented by examples. The technical content of the present disclosure is made clearer, making it easier for those skilled in the art to understand how to implement the present invention. However, the invention can be embodied in many different forms of embodiment. The protection scope of the present invention is not limited to the embodiments mentioned herein. The following description of the embodiments is not intended to limit the scope of the invention.

The directional terms mentioned in the present invention, such as "upper", "lower", "before", "after", "left", "right", "inside", "outside", "side", etc., are only directions in the drawings. The directional terms used herein are used to explain and describe the present invention and are not intended to limit the scope of the present invention.

In the drawings, components having the same structure are denoted by the same reference numerals. Components that are structurally or functionally similar are represented by like numerals. Moreover, dimensions and thickness of each component shown in the drawings are arbitrarily shown for ease of understanding and description. The invention does not limit the size and thickness of each component.

When a component is described as "on" another component, the component can be placed directly on the other component. There may also be an intermediate component on which the component is placed and the intermediate component placed on another component. When a component is described as "installed to" or "connected to" another component, it can be understood as either "installing" or "connecting" directly, or a component is "installed" or "connected" to another component through an intermediate component.

Figure 2:
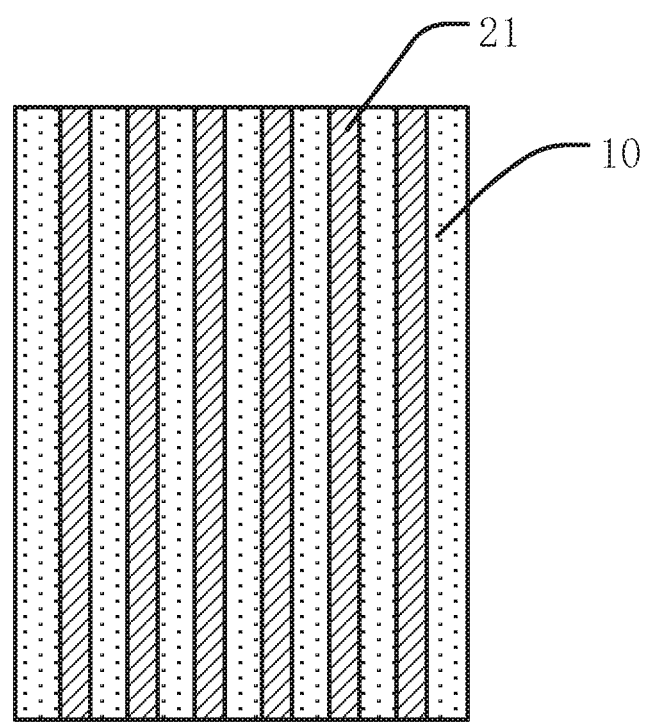
FIG. 2 is a top view of a touch structure according to an embodiment of the present invention.

As shown in FIG. 1 to FIG. 2, the present embodiment provides a touch structure comprising a polarizing layer 10 and a touch layer 20.

The polarizing layer 10 is used to realize a polarizing function. A material of the polarizing layer 10 is a mixture of an electrically conductive polymer and an iodine molecule. In the embodiment, the electrically conductive polymer is polyacetylene, and the molecular formula of the polyacetylene is as follows:

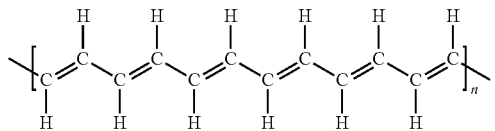

Carbon atoms in each polyacetylene are arranged in two parallel straight lines. At least two of the iodine molecules are arranged in a straight line. A straight line where the iodine molecules are disposed is parallel to a straight line where the carbon atoms are disposed. Currently, the electrically conductive polymer has the highest electrical conductivity and is close to an electrical conductivity of silver.

The iodine molecule is doped in the electrically conductive polymer to adjust the electrical conductivity of the electrically conductive polymer. When the straight line where the iodine molecules are disposed is parallel to the straight line where the carbon atoms in the polyacetylene are disposed, the electrical conductivity of the electrically conductive polymer reaches an optimum state and can be closest to the electrical conductivity of silver. When the iodine molecules are not aligned in the same straight line or the straight line of the iodine molecules is not parallel to the straight line of the carbon atoms in the polyacetylene, the electrical conductivity of the electrically conductive polymer is relatively poor. Therefore, an alignment of the iodine molecules can improve the electrical conductivity of the electrically conductive polymer. At the same time, the alignment of the iodine molecules enables the electrically conductive polymer to have polarization characteristics for realizing polarization characteristics in the touch structure.

The polarizing layer 10 has a thickness ranging from 0.1 μm to 100 μm, which satisfies a thickness requirement of a current polarizing layer.

The electrically conductive polymer has greater strength and hardness than cycloolefin copolymer COP and polyterephthalic plastic PET, so that the polarizing layer 10 made of the electrically conductive polymer can be used as a base layer of the touch layer 20, which can save the use of the base layer and save production costs.

The touch layer 20 is disposed on an upper surface of the polarizing layer 10 for implementing a touch function. The touch layer 20 comprises two or more touch circuits 21. The touch circuits 21 are linear, and each two touch circuits 21 are parallel to each other.

The technical effect of the touch structure in the embodiment is that the electrically conductive polymer is doped with the iodine molecule, which improves the electrical conductivity of the electrically conductive polymer and realizes the polarizing function. The touch layer is directly integrated on the electrically conductive polymer to realize an integrated structure of the polarizing layer and the touch layer, which reduces a thickness of the display panel and improves performance of the display panel.

Figure 3:
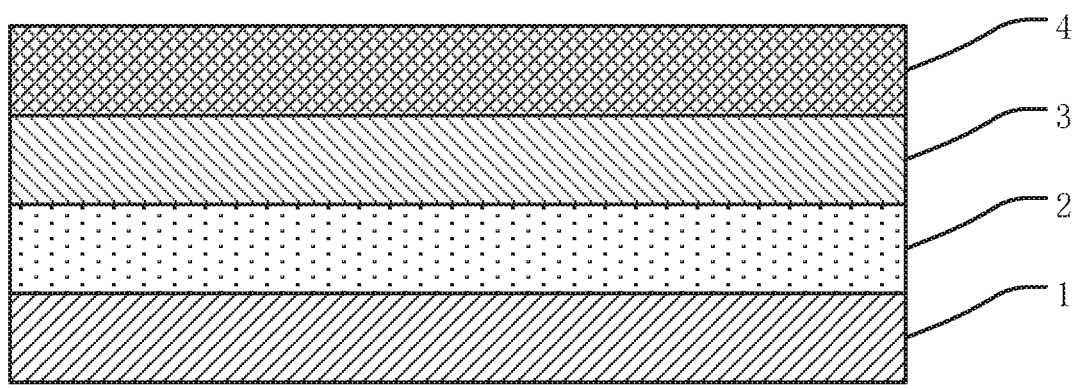
FIG. 3 is a structural view of a display panel according to an embodiment of the present invention.

As shown in FIG. 3, the present embodiment further provides a display panel comprising a substrate 1, a thin film transistor 2, a pixel layer 3, and a touch layer 4.

The substrate 1 is a rigid substrate or a flexible substrate and functions as a substrate.

The thin film transistor 2 is disposed on an upper surface of the substrate 1 and functions as a switching circuit for controlling the display panel. The thin film transistor 2 comprises a buffer layer, an active layer, a gate insulating layer, a gate layer, a dielectric layer, a source/drain layer, a planarization layer, and the like. Since the thin film transistor 2 is prior art, it will not be specifically described herein.

The pixel layer 3 is disposed on an upper surface of the thin film transistor 2 to function as a pixel for emitting light. The pixel layer 3 comprises an anode layer, a pixel defining layer, a light emitting layer, a pixel electrode layer, and the like. Since the pixel layer 3 is a prior art, it will not be specifically described herein.

The touch structure 4 is disposed on an upper surface of the pixel layer 3 for implementing a touch function. The touch structure 4 is the touch structure described above.

The touch structure comprises a polarizing layer and a touch layer.

The polarizing layer is used to realize a polarizing function. A material of the polarizing layer is a mixture of an electrically conductive polymer and an iodine molecule. In the embodiment, the electrically conductive polymer is polyacetylene, and the molecular formula of the polyacetylene is as follows:

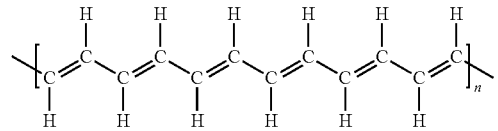

Carbon atoms in each polyacetylene are arranged in two parallel straight lines. At least two of the iodine molecules are arranged in a straight line. A straight line where the iodine molecules are disposed is parallel to a straight line where the carbon atoms are disposed. Currently, the electrically conductive polymer has the highest electrical conductivity and is close to an electrical conductivity of silver.

The iodine molecule is doped in the electrically conductive polymer to adjust the electrical conductivity of the electrically conductive polymer. When the straight line where the iodine molecules are disposed is parallel to the straight line where the carbon atoms in the polyacetylene are disposed, the electrical conductivity of the electrically conductive polymer reaches an optimum state and can be closest to the electrical conductivity of silver. When the iodine molecules are not aligned in the same straight line or the straight line of the iodine molecules is not parallel to the straight line of the carbon atoms in the polyacetylene, the electrical conductivity of the electrically conductive polymer is relatively poor. Therefore, an alignment of the iodine molecules can improve the electrical conductivity of the electrically conductive polymer. At the same time, the alignment of the iodine molecules enables the electrically conductive polymer to have polarization characteristics for realizing polarization characteristics in the touch structure.

The polarizing layer has a thickness ranging from 0.1 µm to 100 µm, which satisfies a thickness requirement of a current polarizing layer.

The electrically conductive polymer has greater strength and hardness than cycloolefin copolymer COP and polyterephthalic plastic PET, so that the polarizing layer made of the electrically conductive polymer can be used as a base layer of the touch layer, which can save the use of the base layer and save production costs.

The touch layer is disposed on an upper surface of the polarizing layer for implementing the touch function. The touch layer comprises two or more touch circuits. The touch circuits are linear, and each two touch circuits are parallel to each other.

The technical effect of the display panel in the embodiment is that the electrically conductive polymer is doped with the iodine molecule, which improves the electrical conductivity of the electrically conductive polymer and realizes the polarizing function. The touch layer is directly integrated on the electrically conductive polymer to realize an integrated structure of the polarizing layer and the touch layer, which reduces a thickness of the display panel and improves performance of the display panel.

In the above, various other corresponding changes and modifications can be made according to the technical solutions and technical ideas of the present invention by those skilled in the art, and all such changes and modifications are within the scope of the claims of the present invention.

What is claimed is:

1. A touch structure, comprising:
   a polarizing layer; and
   a touch layer without a base layer and disposed directly on a surface of the polarizing layer;
   wherein the touch layer comprises a touch circuit that is in contact with the polarizing layer, and
   wherein the polarizing layer is composed of a mixture of an electrically conductive polymer and iodine molecules, the electrically conductive polymer comprising polyacetylene of which the carbon atoms in each polyacetylene unit are arranged in two parallel straight lines that are parallel with a straight line formed by at least two of the iodine molecules.

2. The touch structure as claimed in claim 1, wherein the polarizing layer has a thickness ranging from 0.1 µm to 100 µm.

3. The touch structure as claimed in claim 1, wherein the touch layer further comprises at least another touch circuit, the touch circuits each comprising a touch electrode.

4. The touch structure as claimed in claim 3, wherein the touch circuits are linear.

5. A display panel, comprising the touch structure as claimed in claim 1.

6. The display panel as claimed in claim 5, further comprising:
   a substrate;
   a thin film transistor disposed on a surface of the substrate; and
   a pixel layer disposed on a surface of the thin film transistor away from the substrate;
   wherein the touch structure is disposed on a surface of one side of the pixel layer away from the thin film transistor.

* * * * *